(12) United States Patent
Braun et al.

(10) Patent No.: US 7,702,877 B2
(45) Date of Patent: Apr. 20, 2010

(54) RAID STRIPE LAYOUT SCHEME

(75) Inventors: William A. Braun, Beaverton, OR (US); Benedict J. Jackson, Beaverton, OR (US)

(73) Assignee: ARRIS Group, Suwanee, GA (US)

(*) Notice: Subject to any disclaimer, the term of this patent is extended or adjusted under 35 U.S.C. 154(b) by 489 days.

(21) Appl. No.: 11/646,184

(22) Filed: Dec. 27, 2006

(65) Prior Publication Data

US 2008/0162808 A1    Jul. 3, 2008

(51) Int. Cl.
G06F 12/00    (2006.01)
G06F 13/00    (2006.01)
G06F 13/28    (2006.01)

(52) U.S. Cl. .................. 711/172; 711/114; 711/159

(58) Field of Classification Search .................. 711/114
See application file for complete search history.

(56) References Cited

U.S. PATENT DOCUMENTS

| 6,839,827 | B1* | 1/2005 | Beardsley et al. ........... 711/206 |
| 7,437,507 | B2* | 10/2008 | Sharma et al. ............... 711/114 |
| 2004/0015762 | A1* | 1/2004 | Klotz et al. .................. 714/742 |
| 2007/0180214 | A1* | 8/2007 | Radhakrishnan et al. .... 711/202 |

* cited by examiner

*Primary Examiner*—Matt Kim
*Assistant Examiner*—Ralph A Verderamo, III
(74) *Attorney, Agent, or Firm*—FSP LLC

(57) ABSTRACT

A RAID storage system includes an outer stripe size that is an integer multiple J of a product of an inner stripe size and a number of data disks in a RAID disk set, where J is greater than one (1).

6 Claims, 3 Drawing Sheets

| DATA BLOCK | DISK BLOCK |
|---|---|
| 206 | A1 |
| 208 | B1 |
| 210 | C1 |
| 212 | D1 |
| 214 | A2 |
| 216 | B2 |
| 218 | C2 |
| 220 | D2 |
| 222 | E1 |
| 224 | F1 |
| 226 | G1 |
| 228 | H1 |
| 230 | E2 |
| 232 | F2 |
| 234 | G2 |
| 236 | H2 |
| 238 | A3 |
| 240 | B3 |

201

| DATA BLOCK | DISK BLOCK |
|---|---|
| 206 | A1 |
| 208 | B1 |
| 210 | C1 |
| 212 | D1 |
| 214 | A2 |
| 216 | B2 |
| 218 | C2 |
| 220 | D2 |
| 222 | A3 |
| 224 | B3 |
| 226 | C3 |
| 228 | D3 |
| 230 | E1 |
| 232 | F1 |
| 234 | G1 |
| 236 | H1 |
| 238 | E2 |
| 240 | F2 |

| I/O | DATA BLOCK | PAGE | DISK BLOCK |
|---|---|---|---|
| 1 | 206 | 1 | A1 |
| 2 | 208 | 2 | B1 |
| 3 | 210 | 3 | C1 |
| 4 | 212 | 4 | D1 |
| 5 | 214 | 5 | A2 |
| 6 | 216 | 6 | B2 |
| 7 | 218 | 7 | C2 |
| 8 | 220 | 8 | D2 |
| 9 | 222 | 9 | A3 |
| 10 | 224 | 10 | B3 |
| 11 | 226 | 11 | C3 |
| 12 | 228 | 12 | D3 |

302

| I/O | DATA BLOCK | PAGE | DISK BLOCK |
|---|---|---|---|
| 1 | 206 | 1 | A1 |
| 1 | 208 | 5 | A2 |
| 1 | 210 | 9 | A3 |
| 2 | 212 | 2 | B1 |
| 2 | 214 | 6 | B2 |
| 2 | 216 | 10 | B3 |
| 3 | 218 | 3 | C1 |
| 3 | 220 | 7 | C2 |
| 3 | 222 | 11 | C3 |
| 4 | 224 | 4 | D1 |
| 4 | 226 | 8 | D2 |
| 4 | 228 | 12 | D3 |

RAID STRIPE LAYOUT SCHEME

TECHNICAL FIELD

The present disclosure relates to RAID layout.

BACKGROUND

The layout of information on RAID storage media may affect the performance of systems utilizing the RAID storage. "RAID 4" layout schemes involve striping of data blocks over multiple disks of a disk set, with a dedicated parity disk in each set. RAID 0 follows a similar layout, but without a parity disk. Multiple disk sets may be combined into a logical storage "volume". A "4+1" RAID set has four disks for storing data, and one parity disk. A "5+1" RAID set has five data disks and one parity disk, and so on. Two "4+1" sets may be combined into a RAID volume comprising eight (8) data disks and two parity disks, and so on.

It may be desirable to balance I/O requests across the disks of a RAID disk set and/or volume. Thus it may be desirable to adjust the data layout so that the most common I/O requests result in utilization of most or all of the disks in a set or volume. For example, if in a "4+1" RAID system most read I/O requests are for 1 MB of data at a time, it may be desirable to set the block size (also known as the inner stripe size) of the layout to 256 KB, so that each 1 MB I/O request involves accessing each of the four disks for 256 KB.

Larger inner stripe sizes tend to be more efficient, as each disk may be accessed for a large number of bytes at a time. However, increasing the inner stripe size tends to increase the buffering requirements of applications that use the RAID, because to keep the I/O balanced over all disks of a RAID set requires that the size of I/O requests be the multiple of the inner stripe size and the number of data disks in the set. This requirement exists in order to maintain system performance in the face of a failed disk of a disk set; otherwise balancing the I/O over the disk set may not be a requirement.

Thus, increasing the inner stripe size from 256 KB to 512 KB in a "4+1" RAID system means that I/O requests must be increased by a full megabyte, from 1 MB to 2 MB. When a large number of applications are utilizing the RAID at once, the result may be substantial buffer requirements that tax the memory capability of the system.

SUMMARY

The following summary is intended to highlight and introduce some aspects of the disclosed embodiments, but not to limit the scope of the claims. Thereafter, a detailed description of illustrated embodiments is presented, which will permit one skilled in the relevant art to make and use various embodiments.

A RAID storage system may include and/or involve an outer stripe size that is an integer multiple J of a product of an inner stripe size and a number of data disks in a RAID disk set, where J is greater than one (1). The inner stripe size may be one of 16 KB, 32 KB, an 64 KB, and/or equal to a system memory page size. The outer stripe size may be a least common multiple of I/O request sizes that are likely in a system including the RAID storage system.

A media server may include the RAID system described above, and logic to arrange logical I/O requests into disk I/O requests that result in contiguous reads, from each disk of a disk set of the RAID system, of multiple blocks of data having the inner stripe size. The logic may result in contiguous reads, from each disk of the RAID disk set, of multiple blocks of data having a system memory page size.

The media server may include and/or involve the RAID system storing multiple audio-video streams in blocks equal to the inner stripe size.

Other system/method/apparatus aspects are described in the text (e.g., detailed description and claims) and drawings forming the present application.

BRIEF DESCRIPTION OF THE DRAWINGS

In the drawings, the same reference numbers and acronyms identify elements or acts with the same or similar functionality for ease of understanding and convenience. To easily identify the discussion of any particular element or act, the most significant digit or digits in a reference number refer to the figure number in which that element is first introduced.

FIG. 3 is a block diagram illustrating I/O efficiency through data block "coalescing".

DESCRIPTION

References to "one embodiment" or "an embodiment" do not necessarily refer to the same embodiment, although they may.

Unless the context clearly requires otherwise, throughout the description and the claims, the words "comprise," "comprising," and the like are to be construed in an inclusive sense as opposed to an exclusive or exhaustive sense; that is to say, in the sense of "including, but not limited to." Words using the singular or plural number also include the plural or singular number respectively. Additionally, the words "herein," "above," "below" and words of similar import, when used in this application, refer to this application as a whole and not to any particular portions of this application. When the claims use the word "or" in reference to a list of two or more items, that word covers all of the following interpretations of the word: any of the items in the list, all of the items in the list and any combination of the items in the list.

"Logic" refers to signals and/or information that may be applied to influence the operation of a device. Software, hardware, and firmware are examples of logic. Hardware logic may be embodied in circuits. In general, logic may comprise combinations of software, hardware, and/or firmware.

Figure 1:
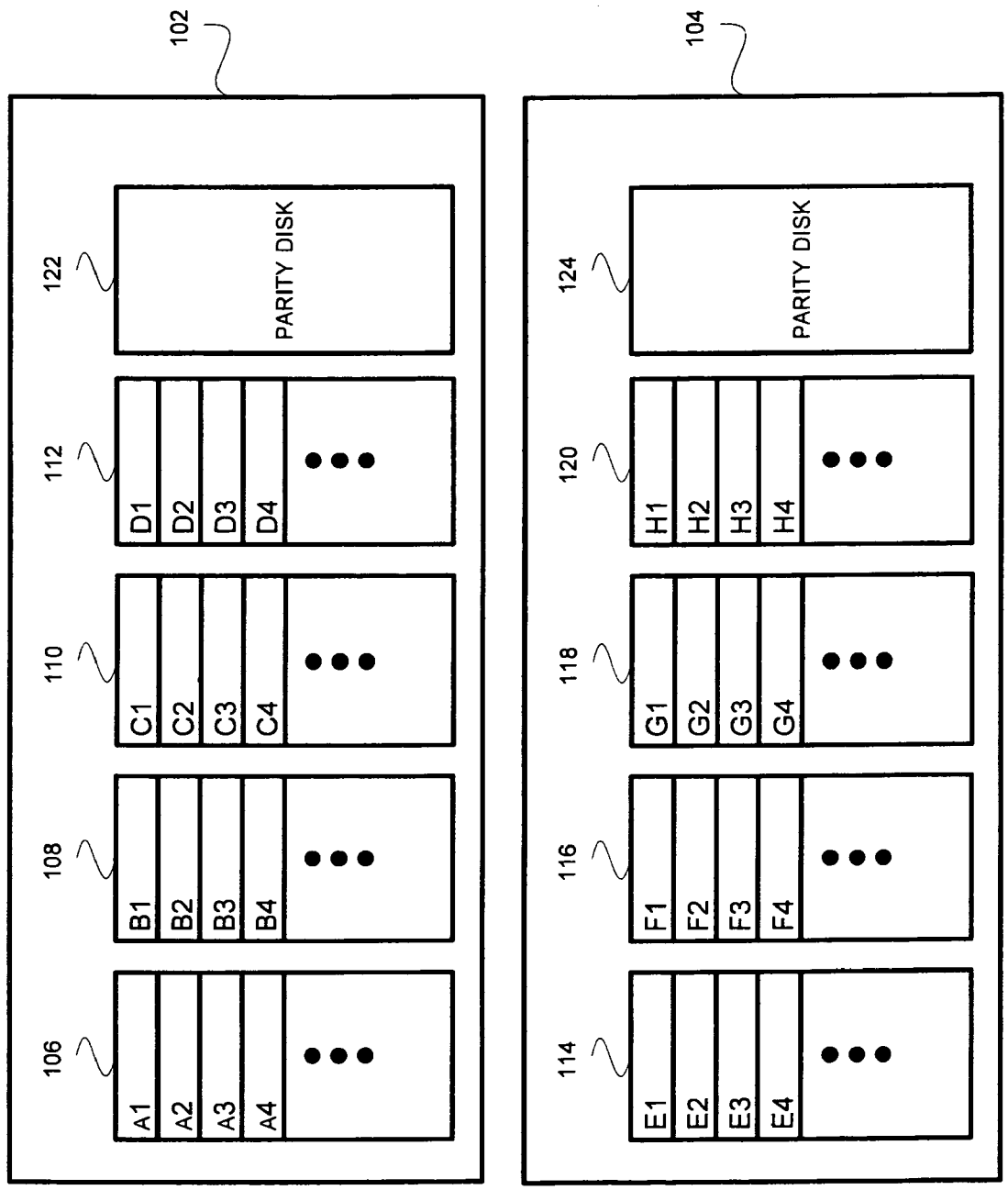
FIG. 1 is a block diagram of an embodiment of a RAID 4 data storage volume.

FIG. 1 is a block diagram of an embodiment of a RAID 4 data storage volume. The volume comprises one or more disk sets 102 and 104. In this case, two sets 102 and 104 of N+1 disks (where N=4) are employed and combined into a single RAID volume comprising eight (8) data disks and two parity disks. The first disk set 102 comprises data disks 106-112 as well as parity disk 122. The second disk set 104 comprises data disks 114-120 and parity disk 124.

An inner stripe width of K data bytes is chosen for each of the disk arrays 102 and 104. Large data sets (such as large audio/video files) are stored in a "stripe" across the disks of a disk set 102, with the first K bytes of the data set on the first disk 106 of the disk set, the second K bytes of the data set on the second disk 108 of the set, and so on.

An outer stripe width is also chosen. The outer stripe width is an integral multiple J of K*N bytes, i.e., the outer stripe width is J*K*N bytes (where K is the inner stripe width and N is the number of data disks in the disk set). The value of J is chosen to be greater than one; and, as will be seen, may be much greater than one. The outer stripe width is the number of bytes of the data set stored on a disk set, before storage of the data set continues on the next disk set of the RAID volume. The value of J may be selected to produce an outer stripe width of J*K*N that's the least common multiple of the desired and/or most likely I/O request sizes that will be used in the system.

When the amount of data to store is greater than N*K bytes, storage either wraps back to the first disk 106 of the first disk set 102 or proceeds on the first disk 114 of the second disk set 104, depending on the outer stripe width. As long as the amount of data to store is less than the outer stripe width, the data continues to be written in K-sized blocks on disks 106, 108, 110, and 112 within the first disk set 102.

When the data set to store is very large, such as when storing an MPEG data stream, an amount of data equal to the outer stripe size is stored on the first disk set 102, then the same amount of data is stored on the second disk set 104, then the same amount of data is stored on the first disk set 102 again, and so on.

The outer stripe size may be chosen to be the least common multiple of the expected or most common read/write sizes that will occur in the system comprising the RAID volume. Thus the outer stripe size may be chosen as the least common multiple of the I/O sizes that applications in the system are likely to use. Selecting the outer stripe size as the least common multiple of expected I/O sizes lessens the splitting I/Os across disk sets. For example, the data sets 102 and 104 may be used for storage of MPEG streams. Applications (such as video pumps) may read the MPEG streams in blocks of (4*K), (8*K), and (16*K), depending for example on the streaming bit rate employed. The least common multiple of 4, 8, and 16 is 16. Thus the outer stripe width J may be selected to be 16*K bytes. Selecting the outer stripe size as the least common multiple of expected I/O sizes enables more I/O operations to be contained within a single disk set, thus improving I/O efficiency.

In RAID 4, a parity block is written for each sub-stripe of data blocks within a disk set. For example, a parity block P1 may be written for blocks A1, B1, C1, and D1. A parity block P2 may be written for blocks A2, B2, C2, and D2, and so on. When one disk of the set fails, the data from a block of that disk may be reproduced from the data of the same sub-stripe on the other disks of the set, using the corresponding parity block. In systems where disk failures are fairly common, it is efficient to read all data in a sub-stripe in a single read I/O request at a time. This way, if one disk has failed, the lost data may be reproduced without again accessing the data disks. Thus, it may be desirable in RAID 4 systems for applications to issue I/O requests having a size at least equal to K*N.

As previously noted, it is also desirable for K to be large to improve the efficiency of accesses to each disk of a RAID set. Combined with the desirability of reading from all disks of a set at once, the result in prior art RAID 4 systems has been the use of large K values and consequently large application buffering requirements. In such prior art systems, even applications that do not require large read requests (such as low bitrate streaming applications) may be forced to provide buffering to accommodate very large reads, due to the large K values employed by the underlying RAID storage volumes.

In one embodiment, applications are provided with flexibility for the size of I/O requests that they issue, without compromising the underlying I/O efficiency of the RAID storage system. This may be accomplished by providing, inter alia, a large outer stripe size and a small inner stripe size. For example, an outer stripe size of 2 MB may be provided, along with an inner stripe size (K) of 16 KB. In general, the outer stripe size is made to be J*K*N, where J is greater than one.

K may be chosen such that K*N reflects the smallest commonly expected read size in the system. It may also be desirable to make K equal to the system memory page size or a multiple thereof.

Thus, a RAID storage system may include and/or involve an outer stripe size that is an integer multiple J of a product of an inner stripe size and a number of data disks in a RAID disk set, where J is greater than one (1). The inner stripe size may be one of 16 KB, 32 KB, and 64 KB, or any size, and/or equal to a system memory page size. The outer stripe size may be a least common multiple of I/O request sizes that are likely in a system including the RAID storage system.

A media server (one or more computing systems designed to provide high-performance streaming of multiple audio and/or video streams simultaneously) may include the RAID system described above, and logic to arrange logical I/O requests into disk I/O requests that result in contiguous reads, from each disk of a disk set of the RAID system, of multiple blocks of data having the inner stripe size. The logic may result in contiguous reads, from each disk of the RAID disk set, of multiple blocks of data having a system memory page size.

The media server may include and/or involve the RAID system storing multiple audio-video streams in blocks equal to the inner stripe size.

Although discussed in the context of RAID 4, the layout schemes described herein apply equally to RAID 0 systems (which are similar to RAID 4 but without the parity disks), or to any compatible RAID scheme that may be subsequently developed.

Figure 2:
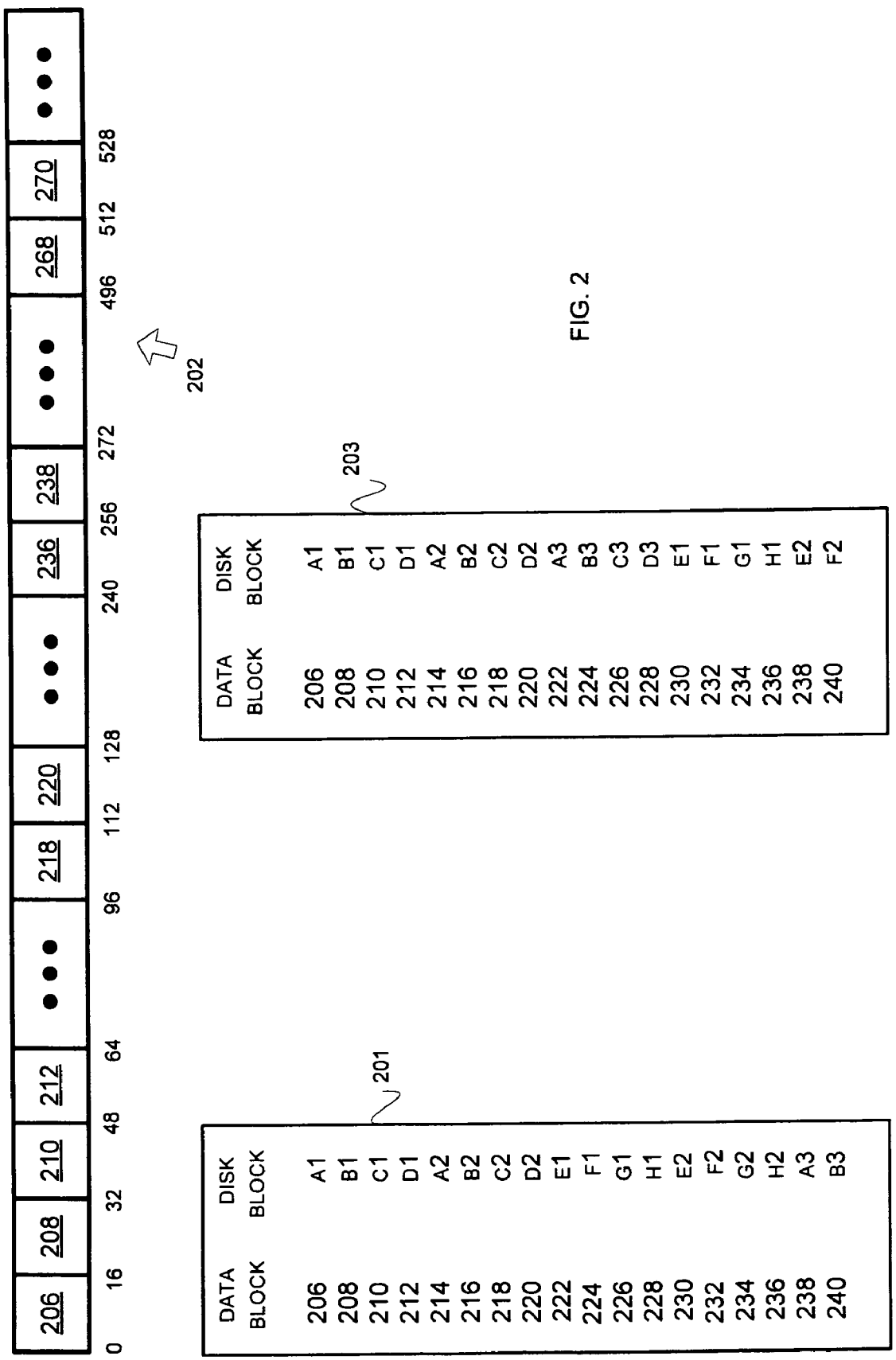
FIG. 2 is a block diagram providing examples of how an MPEG data stream may be stored on the two disk sets of FIG. 1.

FIG. 2 is a block diagram providing examples of how an MPEG data stream may be stored on the two disk sets 102 and 104 of FIG. 1. The stream is divided for storage purposes into 16 KB blocks numbered 206-270. Table 201 shows the storage layout for an outer stripe size of 128 KB. This is actually a smaller outer stripe size than may used in many embodiments in practice, but is useful for purposes of illustration. Table 203 shows the storage layout for an outer stripe size of 192 KB. The actual inner and outer stripe sizes used in practice will vary with implementation.

In table 201 (outer stripe size=128 KB), the first data block 206 of the stream may be stored in the first block A1 of the first disk 106 of the first disk set 102. Data block 208 may be stored as the first block B1 of the second disk 108 of the first disk set 102, data block 210 stored as block C1 of the third disk 110, and data block 212 stored as the block D1 of the fourth disk 112. Using the XOR operation, a parity block may be written and stored on the parity disk 122 of the first disk set 102.

At this point, 64 KB of data has been stored on the first disk set 102, comprising a first sub-stripe of data. This is less than the 128 KB outer stripe size. Thus, the next data block 214 of the MPEG stream may be stored as the second block A2 of the first disk 106. Block 216 may be stored as block B2, block 218 as block C2, and block 220 as block D2, comprising a second sub-stripe of data. A parity block for this second sub-stripe may also be written (not illustrated).

At this point 128 KB of data has been written, comprising a complete outer stripe. Data from block 222 may then be stored in disk block E1 of the second disk set 104. Data block 224 may be stored in disk block F1, 226 in block G1, and 228 in block H1. A parity block may be written for E1, F1, G1, and H1 on parity disk 124. Blocks 230, 232, 234, and 236 may be written to the second disk set 104 in disk blocks E2, F2, G2, and H2 respectively. Blocks 230 through 244 may then be written on the first disk set 102. The writing of data from the MPEG stream may continue to alternate from disk set 102 to disk set 104 and back again, with one outer stripe size of data being written on each disk set before switching to the next disk set.

In table 203 (outer stripe size=192 KB), data block 206, the first data block, may be stored on the first block A1 of the first disk 106 of the first disk set 102. Data block 208 may be stored as the first block B1 of the second disk 108 of the first disk set 102, data block 210 stored as block C1 of the third disk 110, and data block 212 stored as the block D1 of the fourth disk 112.

At this point, less than the 192 KB outer stripe size has been written, thus the next data block 214 may be stored as the second block A2 of the first disk 106. Block 216 may be stored as block B2, block 218 as block C2, and block 220 as block D2. At this point, 128 KB of data has been stored. This is still less than the 192 KB outer stripe size, thus the next data block 222 may be stored as block A3, block 224 may be stored as block B3, block 226 as block C3, and block 228 as block D3. As before, for each sub-stripe of data a parity block may also be written (not illustrated).

At this point 192 KB of data has been written, so that storage now proceeds to the second disk set 104. Thus data block 230 may be stored in disk block E1, 232 in block F1, 234 in block G1, and 236 in block H1, and so on.

FIG. 3 is a block diagram illustrating I/O efficiency through data block "coalescing". In Table 301, the operating system has expressed an I/O request to read data blocks 206 through 228 of the MPEG data stream 202 shown in FIG. 2. The I/O request is expressed as a vector (table) where the data blocks 206 through 228 are requested to be placed in memory system pages 1-12, respectively. For purposes of this example, the outer stripe size of the underlying RAID 4 storage system is 192 KB as illustrated in table 203 of FIG. 2. Twelve disk I/O operations are needed to satisfy the read request, three for each of the four data disks 106-112 of disk set 102.

Table 302 shows how the same I/O request may be serviced more efficiently by taking advantage of the small inner stripe size relative to the large outer stripe size of the underlying RAID 4 layout. The disk I/O vector has been rearranged such that only four (4) disk I/O operations are needed, one per data disk of the disk set 102. Data blocks 206, 214, and 222 may be read contiguously from disk blocks A1, A2, and A3 of disk 106. Data blocks 208, 216, and 224 may be read contiguously from disk blocks B1, B2, and B3 of disk 108. Data blocks 210, 218, and 226 may be read contiguously from disk 110, and data blocks 212, 220, and 228 may be read contiguously from disk 112. All four data disks 106-112 are engaged when satisfying the read operation, which is desirable in RAID 4 storage systems as previously explained. Furthermore, 3*K worth of data is read at once from each disk, which again is more desirable than a series of three I/O accesses of 1*K apiece per disk, for reasons previously explained. Disk I/O coalescing may be performed in various ways that will be apparent to those skilled in the art in light of the described RAID 4 layout, depending on the operating system implementation.

Similar efficiencies may be achieved for an I/O request that is only ⅔ as large as the one described above. For such a request, the disk I/O vector may be rearranged such that only four (4) disk I/O operations are needed, one per data disk of the disk set 102. Data blocks may be read contiguously from disk blocks A1, A2 of disk 106. Data blocks may be read contiguously from disk blocks B1, B2 of disk 108. Data blocks may be read contiguously from C1, C2 of disk 110, and data blocks may be read contiguously from D1, D2 of disk 112. All four data disks 106-112 are engaged when satisfying the read operation, while 2*K worth of data is read at once from each disk, which is more desirable than a series of two I/O accesses of 1*K apiece per disk.

Thus, a conventional RAID system (e.g. RAID 4, RAID 0) may be made more efficient and flexible by employing a data layout and I/O and/or page vector transformations consistent with the principles described herein. Employing the principles described herein may enable "late binding" of I/O request sizes, i.e. selection of the amount of data to read from each disk of a RAID set in order to service an I/O request may be done at IO time rather than at RAID volume construction time.

Those having skill in the art will appreciate that there are various vehicles by which processes and/or systems described herein can be effected (e.g., hardware, software, and/or firmware), and that the preferred vehicle will vary with the context in which the processes are deployed. For example, if an implementer determines that speed and accuracy are paramount, the implementer may opt for a hardware and/or firmware vehicle; alternatively, if flexibility is paramount, the implementer may opt for a solely software implementation; or, yet again alternatively, the implementer may opt for some combination of hardware, software, and/or firmware. Hence, there are several possible vehicles by which the processes described herein may be effected, none of which is inherently superior to the other in that any vehicle to be utilized is a choice dependent upon the context in which the vehicle will be deployed and the specific concerns (e.g., speed, flexibility, or predictability) of the implementer, any of which may vary. Those skilled in the art will recognize that optical aspects of implementations will require optically-oriented hardware, software, and or firmware.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood as notorious by those within the art that each function and/or operation within such block diagrams, flowcharts, or examples can be implemented, individually and/or collectively, by a wide range of hardware, software, firmware, or virtually any combination thereof. Several portions of the subject matter subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, can be equivalently implemented in standard integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and/or firmware would be well within the skill of one of skill in the art in light of this disclosure. In addition, those skilled in the art will appreciate that the mechanisms of the subject matter described herein are capable of being distributed as a program product in a variety of forms, and that an illustrative embodiment of the subject matter described herein applies equally regardless of the particular type of signal bearing media used to actually carry out the distribution. Examples of a signal bearing media include, but are not limited to, the following: recordable type media such as floppy disks, hard disk drives, CD ROMs, digital tape, and computer memory; and transmission type media such as digital and analog communication links using TDM or IP based communication links (e.g., packet links).

In a general sense, those skilled in the art will recognize that the various aspects described herein which can be implemented, individually and/or collectively, by a wide range of hardware, software, firmware, or any combination thereof can be viewed as being composed of various types of "electrical circuitry." Consequently, as used herein "electrical circuitry" includes, but is not limited to, electrical circuitry having at least one discrete electrical circuit, electrical circuitry having at least one integrated circuit, electrical circuitry having at least one application specific integrated circuit, electrical circuitry forming a general purpose computing device configured by a computer program (e.g., a general purpose computer configured by a computer program which at least partially carries out processes and/or devices described herein, or a microprocessor configured by a computer program which at least partially carries out processes and/or devices described herein), electrical circuitry forming a memory device (e.g., forms of random access memory), and/or electrical circuitry forming a communications device (e.g., a modem, communications switch, or optical-electrical equipment).

Those skilled in the art will recognize that it is common within the art to describe devices and/or processes in the fashion set forth herein, and thereafter use standard engineering practices to integrate such described devices and/or processes into larger systems. That is, at least a portion of the devices and/or processes described herein can be integrated into a network processing system via a reasonable amount of experimentation.

The foregoing described aspects depict different components contained within, or connected with, different other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality.

What is claimed is:

1. A RAID storage system comprising: an outer stripe size that is an integer multiple J of a product of an inner stripe size and a number of data disks in a RAID disk set where J is greater than one (1);
wherein the outer stripe size being a least common multiple of most common I/O sizes that will occur in a system comprising the RAID storage system;
wherein the inner stripe size describes how many bytes of data are stored on a data disk in a first RAID disk set before storing additional data on a next disk in the first RAID disk set;
wherein the outer stripe size describes how many bytes of data are stored on the first RAID disk set before storing additional data on a second RAID disk set such that when an amount of data to be stored is greater than the product of the inner stripe size and the number of data disks in the first RAID disk set, storage either wraps back to a first data disk of the first disk set if the amount of data to be stored is less than the outer stripe size or proceeds to a first disk of the second disk set if the amount of data to be stored is greater than the outer stripe size;
and wherein contiguous blocks of a data stream are stored on different data disks In the RAID disk set.

2. The RAID storage system of claim 1, wherein the inner stripe size is one of 16 KB, 32 KB, and 64 KB.

3. The RAID storage system of claim 1, wherein the inner stripe size equal to M times a system memory page size, where M is an integer greater than or equal to one (1).

4. A media server comprising:
a RAID storage system comprising a data layout comprising an outer stripe size that is an integer multiple J of a product of an inner stripe size and a number of data disks in a disk set of the RAID storage system, where J is greater than one (1);
logic to arrange logical I/O requests into disk I/O requests that result in contiguous reads, from each disk of the RAID disk set, of multiple blocks of data having the inner stripe size;
wherein the outer stripe size being a least common multiple of most common I/O sizes that will occur in a system comprising the RAID storage system;
wherein the inner stripe size describes how many bytes of data are stored on a data disk in a first RAID disk set before storing additional data on a next disk in the first RAID disk set;
wherein the outer stripe size describes how many bytes of data are stored on the first RAID disk set before storing additional data on a second RAID disk set such that when an amount of data to be stored is greater than the product of the inner stripe size and the number of data disks in the first RAID disk set, storage either wraps back to a first data disk of the first disk set if the amount of data to be stored is less than the outer stripe size or proceeds to a first disk of the second disk set if the amount of data to be stored is greater than the outer stripe size;
and wherein contiguous blocks of a data stream are stored on different disks of the RAID disk set.

5. The media server of claim 4, wherein the logic to arrange logical I/O requests into disk I/O requests that result in contiguous reads, from each disk of the RAID disk set, of multiple blocks of data having the inner stripe size further comprises:
logic to arrange logical I/O requests into disk I/O requests that result in contiguous reads, from each disk of the RAID disk set, of multiple blocks of data having a system memory page size.

6. The media server of claim 4, further comprising:
the RAID system storing multiple audio-video streams in blocks equal to the inner stripe size.

* * * * *